United States Patent
Novik et al.

(10) Patent No.: US 7,401,103 B2
(45) Date of Patent: Jul. 15, 2008

(54) REPLICATION PROTOCOL FOR DATA STORES

(75) Inventors: Lev Novik, Bellevue, WA (US); Irena Hudis, Bellevue, WA (US); Douglas B. Terry, San Carlos, CA (US); Vivek J. Jhaveri, Brooklyn, NY (US); Sanjay Anand, Hyderabad, A.P., 5000033 (IL); Ashish B. Shah, Sammamish, WA (US); Okechukwu Echeruo, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 10/631,212

(22) Filed: Jul. 31, 2003

(65) Prior Publication Data

US 2005/0027817 A1    Feb. 3, 2005

(51) Int. Cl.
*G06F 17/30* (2006.01)
(52) U.S. Cl. ............... 707/203; 707/201; 707/104.1
(58) Field of Classification Search ............... 707/200, 707/202, 203, 104, 100, 1
See application file for complete search history.

(56) References Cited

U.S. PATENT DOCUMENTS

| 6,247,135 | B1 * | 6/2001 | Feague | 713/400 |
|---|---|---|---|---|
| 6,487,560 | B1 * | 11/2002 | LaRue et al. | 707/203 |
| 6,928,467 | B2 * | 8/2005 | Peng | 709/219 |
| 2002/0133508 | A1 * | 9/2002 | LaRue et al. | 707/202 |
| 2002/0194207 | A1 * | 12/2002 | Bartlett et al. | 707/203 |
| 2005/0015436 | A1 | 1/2005 | Singh | |
| 2005/0086272 | A1 | 4/2005 | Novik | |
| 2005/0125430 | A1 | 6/2005 | Souder | |
| 2006/0184589 | A1 | 8/2006 | Lees | |
| 2006/0190572 | A1 | 8/2006 | Novik | |
| 2006/0215569 | A1 | 9/2006 | Khosravy | |

OTHER PUBLICATIONS

Byung-Yun Lee, et al., *Data Synchronization Protocol in Mobile Computing Environment Using SyncML*, 5th IEEE International Conference on High Speed Networks and Multimedia Communication, 2002, pp. 133-137.

M. Adaka, et al., *A Dynamic Synchronization Protocol and Scheduling Method Based on Timestamp Ordering for Real-Time Transactions*, Institute of Electronics Information and Communication Engineering, Apr. 1999, vol. J82D-I, No. 4, pp. 560-570.

A. Fukii et al., *A Fast Sequential Distributed Synchronization Protocol*, Systems and Computers of Japan, Nov. 15, 1998, vol. 29, No. 12, pp. 11-18.

(Continued)

*Primary Examiner*—Tim Vo
*Assistant Examiner*—Dangelino Gortayo
(74) *Attorney, Agent, or Firm*—Workman Nydegger

(57) ABSTRACT

A protocol for replicating replicas in a sync community. Each replica maintains a knowledge that represents changes that the replica is aware of. Each replica does not typically maintain knowledge about other replicas. The protocol includes messages that include knowledge about changes on the various replicas. Using the knowledge, the replicas can enumerate changes and send the changes using asynchronous messages that do not need to be received in any particular order. The protocol enables filters to ensure that a valid replication is possible using a minimum knowledge argument. The protocol also enables replicas to partially replicate using filtered knowledge.

30 Claims, 8 Drawing Sheets

OTHER PUBLICATIONS

C. Mourlas, et al., *Task Synchronization for Distributed Real-Time Applications*, IEEE Computer Social, 1999, pp. 184-190.

J. Parrow et al., *Designing a Multiway Synchronization Protocol*, computer Communications, Dec. 1996, vol. 19, No. 14, pp. 1151-1160.

S. Chrobot et al., *Common Primitives for Synchornisation Protocols*, Kuwait Journal of Science & Engineering, 1996, pp. 97-111.

R. Rajkumar, *Real-Time Synchronization Protocols for Shared Memory Multiprocessors*, IEEE Computer Social Press, 1990, pp. 116-123.

S. Jajodia et al., *Transaction Processing in Multilevel-Secure Databases Using Replicated Architecture*, IEEE Computer Social Press, 1990, pp. 360-368.

E. Rahm, *A reliable and Efficient Synchronization Protocol for Database Sharing Systems*, Fault-Tolerant Computer Systems 3$^{rd}$ Interantional CI/ITG/GMA Conference Proceedings, 1987, pp. 336-347.

S. Miranda, *A Formal Specification Framework for Synchronization Protocols in Distributed Data Bases*, Distributed Data Sharing Systems Proceedings of the Second International Seminar, Netherlands, 1982, pp. 45-54.

Office Action mailed Jul. 11, 2007 in related case U.S. Appl. No. 10/631,591.

\* cited by examiner

Exception List $K_A = A5B3C1D10$
$\quad +C2$
$\quad +C3$
$\quad +C4$
$\quad +C5$
$\quad = A5B3C5D10$ $K_B = A3B3C5D8$
$\quad +A4$
$\quad +A5$
$\quad +D9$
$\quad +D10$
$\quad = A5B3C5D10$

FIG. 7A

Pointwise Maximum

A5B3C1D10
A3B3C5D8
$K_A = K_B = A5B3C5D10$

FIG. 7B $K = \quad A5 \quad B1 \quad C5 \quad D10$
$\quad +A7 \quad +B2 \quad C6$
$\quad +A8 \quad +B3 \quad C7$
$\quad +A9 \quad +B4 \quad C8$
$\quad +A10 \quad +B6$ $K = \quad A5 \quad B4 \quad C8 \quad D10$
$\quad +(A7:A10)+B6$

FIG. 7C

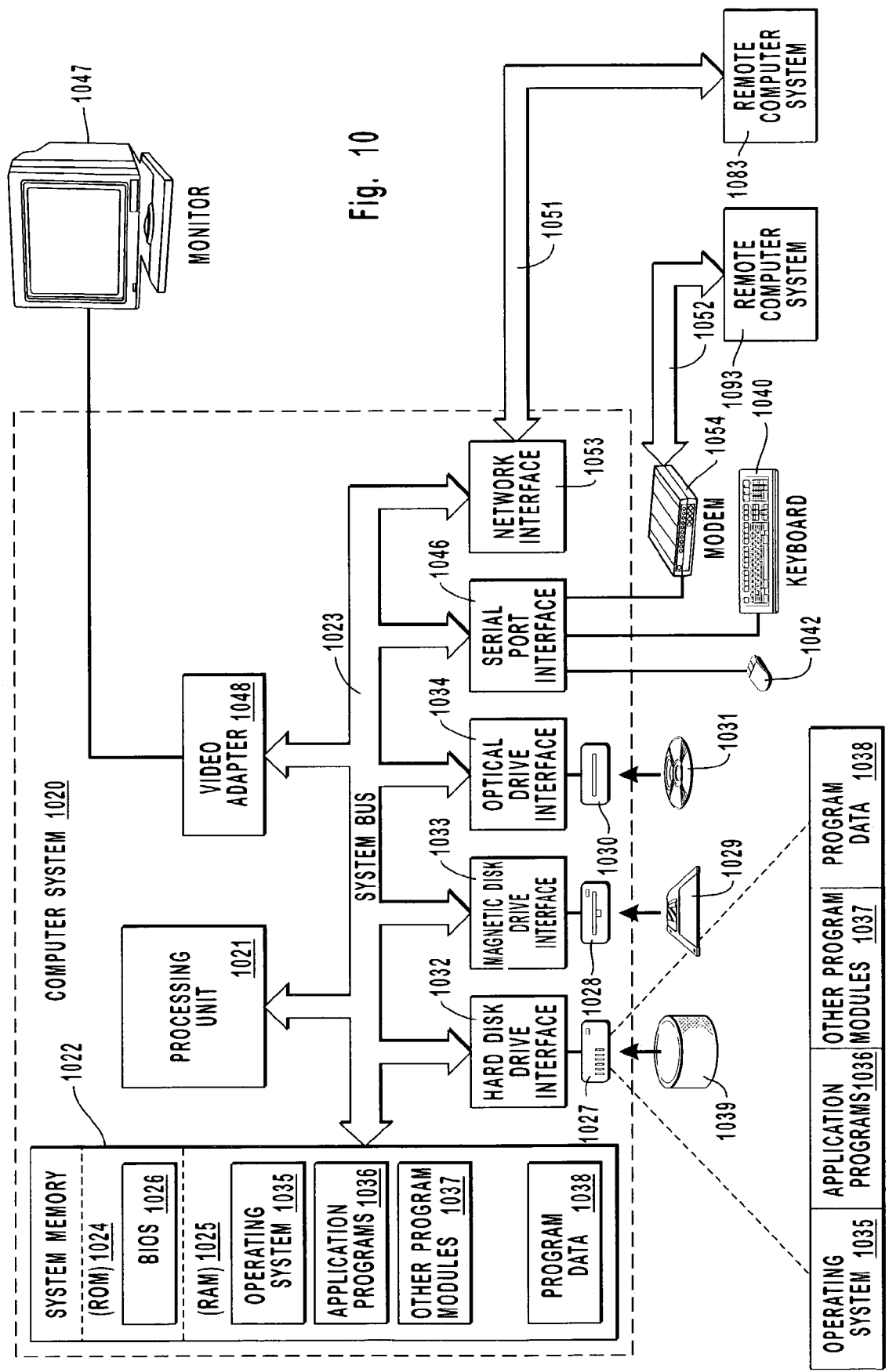

REPLICATION PROTOCOL FOR DATA STORES

BACKGROUND OF THE INVENTION

1. The Field of the Invention

The present invention generally relates to systems and methods for replicating data stores. More specifically, the present invention relates to a protocol for replicating data stores in a sync community.

2. Background and Relevant Art

Background

In today's world of digital information handling, individuals may store information or data in a variety of different devices and locations. Often the user stores the same information in more than one device and/or location. Obviously, the user would like all of the various data stores to have the same information without having to manually input the same changes to each data store. Replication is the process used to ensure that each data store has the same information.

For example, a user may maintain an electronic address book in a myriad of different devices or locations. The user may maintain the address book, for example, on a personal information manager stored on their desktop computer, on their laptop computer, in a personal digital assistant (PDA), in an on-line contacts manager, and the like. The user can modify the electronic address books in each location by, for example, adding a contact, deleting a contact, or changing contact information. One goal of replication is to ensure that the change made on a particular device is ultimately reflected in the data stores of the user's other devices.

Various problems with current replication methods include inefficient use of bandwidth by replicating items that are already replicated but appear to be unreplicated, replication reflection, replication loops where data in one replica is continually updated and replaced, having data that is replicated being perceived as in conflict, and the like.

Further, some methods of replication use synchronous protocols that require handshaking and message acknowledgement. Because these protocols require handshaking and acknowledgement, these protocols normally have a time-out parameter within which acknowledgements should be sent. As a result, the connection between replicating replicas should be active during an entire replication. In addition, some protocols require that changes be sent and received in a certain order. If the changes are sent out of order, changes that are chronologically less current may be used to replace more current items.

Current protocols may also require the replicas to suspend other operations until changes are received and applies. This is done because changes must be applied in the order that they are made. If other operations are not suspended, changes may be made that would then be replaced by chronologically less current changes. Current protocols also suffer from problems when changes are sent by one replica and not received by another. In some cases, the a replication anchor may be updated by the sending replica such that the sending replica believes that changes have been received by another replica when in fact they have not.

In a replicated system, simply ensuring that every replica in a sync community sees every action or change is not sufficient to ensure eventual consistency among the replicas in the sync community. The replicas should apply changes in a consistent order, resolve conflicts in a consistent manner.

BRIEF SUMMARY OF THE INVENTION

These and other limitations are overcome by the present invention, which relates to a protocol that allows replicas in a sync community to determine which changes another replica is aware of, request information about changes, convey information about changes, agree on an order in which changes should be applied, determine when two changes are in conflict, convey conflict resolutions to other replicas, and the like.

Each replica in the sync community maintains a "knowledge" that represents the changes that the particular replica is aware of. The knowledge of a particular replica enables that replica to be unconcerned with both the number of replicas in the sync community and the topology of the sync community. The knowledge is often represented as a knowledge vector that includes a change ID for the various replicas in the sync community. Each change ID includes a (replica ID, max version) pair. Thus the knowledge of a particular replica identifies all changes on replicas within the sync community that the particular replica is aware of.

In one embodiment, the protocol of the present invention is asynchronous and no strict request-response semantics are assumed. Knowledge is part of the information conveyed using the protocol described herein. The protocol defines message formats and the semantics of those messages. In some instances, the messages also include the responsibility of the message recipient. Messages can be sent as individual messages or in batches of messages. In one embodiment, the messages contain enough information such that a replication can recover in situations where a particular message was not delivered.

In one embodiment, replication begins when a first replica broadcasts a request changes message that includes the knowledge of the replica. A second replica can respond with a convey changes message that includes changes that were identified by comparing the knowledge of the first replica in the request changes message with the knowledge of the second replica. The first replica then does conflict detection and applies changes where appropriate. Then, the second replica sends a complete bundle message that is used to finalize the replication and the first replica merges the learned messages and updates its knowledge. Other messages can be used in an asynchronous manner to send information during replication.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims.

BRIEF DESCRIPTION OF THE DRAWINGS

In order to describe the manner in which the above-recited and other features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7A illustrates one embodiment of updating knowledge in a replica subsequent to a replication using an exception list;

FIG. 7B illustrates one embodiment of updating knowledge in a replica subsequent to a replication using a pairwise maximum of knowledge vectors;

FIG. 7C illustrates one embodiment of updating knowledge in a replica subsequent to a replication where exceptions exist in the updated knowledge;

FIG. 10 illustrates an exemplary computer system that is a suitable operating environment for embodiments of the present invention.

DETAILED DESCRIPTION OF THE PREFERRED EMBODIMENTS

Figure 2:
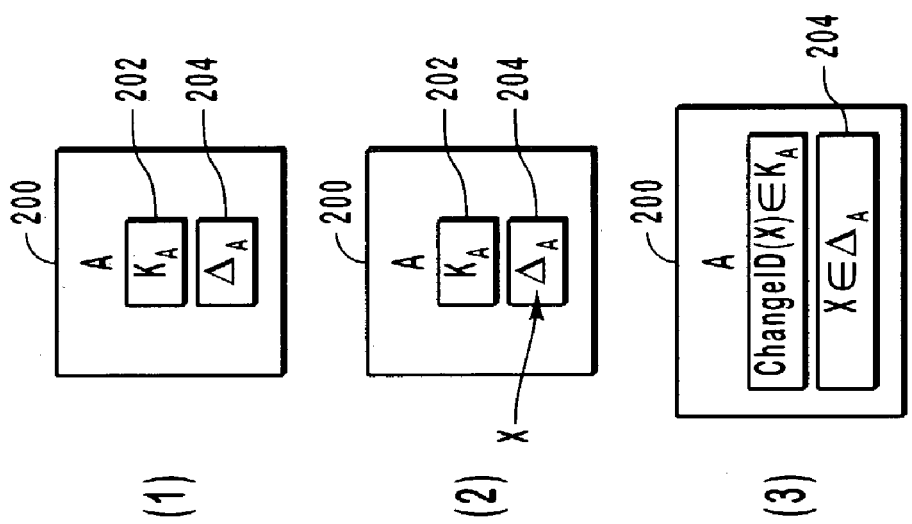
FIG. 2 illustrates a replica and a timewise illustration showing a change being added to the replica and the knowledge of the replica being updated to include the change.

The present invention extends to both systems and methods for replicating data on data stores or replicas and more specifically to a protocol for replicating data stores or replicas. Replication typically occurs among a group of participating replicas or data stores that form a sync community. Advantageously, the total membership of the sync community does not necessarily need to be known to any given replica at any given time. The topology, i.e. which replicas replicate directly with which other replicas, of the sync community is also not necessarily known to any given replica at any given time. Further, the replicas do not need to know the overall synch schedule, i.e. when replicas replicate with each other. Each replica in the sync community has an ID, which is a global unique identifier (GUID) in one embodiment.

Each replica maintains "knowledge" that facilitates efficient and improved replication. In one embodiment, knowledge is metadata that expresses or represents the changes that are known to a given replica. Changes include, but are not limited to, writes, deletes, moves, copies, and the like or any combination thereof. Changes on a particular replica may have been authored by other replicas in the sync community and have been received via replication. Knowledge may be represented as a vector of pairs or change IDs where each pair or change ID represents a replica ID and a maximum version (replica ID, max version) in one embodiment. The number of pairs in a particular knowledge vector may change as replicas are added to or removed from the sync community. While the knowledge may be expressed as a knowledge vector, other embodiments of the invention contemplate other expressions of knowledge as well. For example, some embodiments of the invention express knowledge using any expression of knowledge in which one can (1) add a change to the expression of knowledge, (2) check whether a change is included in the expression of knowledge, and (3) merge two expressions of knowledge together. While the knowledge vector may also be expressed in other suitable manners, it is advantageous to concisely represent the changes of which a particular replica is aware. There is no requirement that the particular knowledge specifically contain a change ID for each replica in the sync community. Replicas are relieved from tracking what other replicas already know, as this information is more effectively represented by the knowledge of each replica.

The replicas in sync community replicate by providing their own knowledge to the replica with which they replicate. To reduce the amount of data representing knowledge that should be sent between replicating replicas, the knowledge may be expressed as a knowledge vector as previously described. Thus, the knowledge that is sent between the replicas does not need to include every change ID corresponding to each change, but may be in the form of a vector that represents a number of change IDs. For example, if a replica is aware of all changes made by a replica A from a first change to a tenth change, and all changes made by a replica labeled B from a first change to a fifth change, the replica might send a knowledge vector A10B5 (instead of A1A2A3A4 . . . B5) indicating that the replica is aware of all changes corresponding to change IDs A1 to A10 and all changes corresponding to change IDs B1 to B5.

Figure 1:
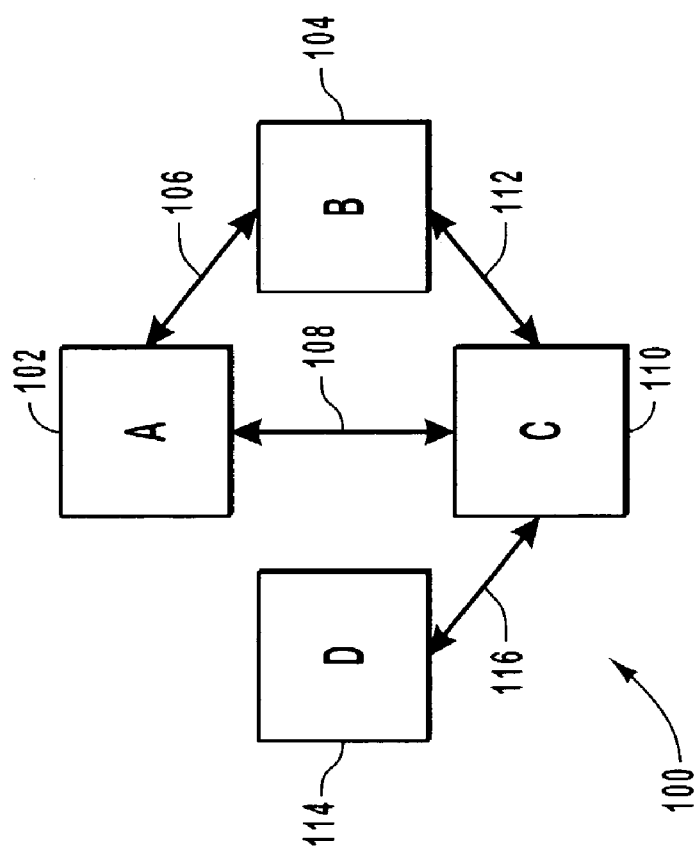
FIG. 1 illustrates an example of a sync community for implementing embodiments of the present invention.

FIG. 1 illustrates one example of a sync community 100 with the illustrated topology. The sync community 100 includes a number of replicas and is one example of an environment for implementing embodiments of the present invention. The replicas in the sync community 100 represent various replicas (also referred to herein as data stores) that may include, but are not limited to, computers, notebook computers, personal digital assistants, cellular telephones, other wireless devices, server computers, online services, and the like or any combination thereof.

In FIG. 1, a replica A 102 may be electronically coupled to a replica B 104 through a communication link 106. The replica A 102 may be connected through a communication link 108 to a replica C 110. Replica C 110 may be connected to replica B 104 through a communication link 112. Replica C 110 may further be connected to a replica D 114 through a communication link 116. In this sync community 100, although not all of the replicas are directly connected through communication links, changes in any of the replicas can be replicated to any of the other replicas within the sync community 100.

For example, for the replica A 102 to be replicated with the replica D 114, replicas A 102 and C 110 may be replicated through the communication link 108. Thus, replica C 110 includes changes made on replica A 102. Replicas C and D then replicate through the communication link 116, and as such replica D 114 includes changes from replica A 102. In this way, replica A 102 can replicate with replica D 114 without any sort of direct link. In fact, replicas A 102 and D 114 may not even be aware of each other's existence within the sync community 100. The illustrated communication links can be wired and/or wireless links.

To accomplish replication, some embodiments of the present invention implement a protocol that can be used by replicas within the sync community 100. The protocol includes a number of messages that can be sent between the replicas when performing replication operations.

Many of the messages of the protocol include knowledge arguments that indicate the knowledge in a replica sending a message, or the knowledge available to a replica at the time a change was made. Because of this feature, the messages may be used in an asynchronous protocol. In one example, there is no need for one replica to acknowledge that changes have been received and applied from another replica. This is because the knowledge that is sent between the replicas indicates what changes have been received and applied.

Advantageously, changes may be sent in any order. A replica can use the knowledge sent with a change and the knowledge existing on the replica receiving the change to determine if a change should be applied, or if other changes need to be received and applied first.

A replica can also send a change with associated knowledge by writing the change to a removable storage medium such as a floppy disk or CD-ROM. A computer user can physically transport the floppy disk or CD-ROM to another replica where that replica can decide whether or not to accept the change and update the replica's knowledge. Using the knowledge, a replica can identify any changes on the removable storage medium that are appropriate to apply to the replica. Similarly, a replica can store a change and associated knowledge to a public area of a server where other replicas can retrieve the change and apply them if it is appropriate to do so.

Because the protocol messages include the knowledge and/or other knowledge arguments, so long as the protocol message can be deposited on a computer in some type of raw data format, the protocol may be used in a synch community with computers that do not have the capability of communicating through protocol. For example, a replica in the synch community sends a message to a computer that is not able to communicate through the protocol. The computer stores the message in some storage area such as those described in connection with FIG. 10 below. Another replica in the topology can retrieve the message from the computer. Thus, effective replication can be performed.

One message is a "request changes" message. An exemplary request change message is as follows: RequestChanges (A4B2C0D1). The request changes message includes at least one argument. In this example, the argument is the knowledge of the replica sending the request changes message. In this way, a replica that receives the request changes message may send only the changes that the replica sending the request changes message does not have or is not aware of. The knowledge sent in the request changes message can be compared against the knowledge of the replica receiving the request changes to enumerate the changes that the first replica is unaware of or does not know.

Another message in the protocol is a "convey changes" message. An exemplary convey changes message is as follows: ConveyChanges(I, B4, A3B3C0D1). The convey changes message includes, in one embodiment of the invention, three arguments including a change (I), a change ID (B4), and made-with-knowledge value (A3B3C0D1). The change is the actual data that will be stored or updated in the replica receiving the convey changes message. The change ID is the unique label assigned to the change. Notably as mentioned above, in one embodiment of the invention, the change ID includes a replica ID (in the present example "B") and a change enumeration or version (in the present example "4"). While in some cases the replica ID corresponds to the replica in which the change was made, in other embodiments, the replica ID may correspond to another replica such as in the embodiment described above where one replica assigns change IDs for other replicas. The made-with-knowledge value is the knowledge available to the replica that assigned the change ID to the change at the time the change was created. The made-with-knowledge argument can be used for conflict detection as described in more detail below. Notably, the convey changes message might not include the made-with-knowledge argument if conflict detection is not performed.

Another message existing in the protocol of some embodiments of the invention is a "complete bundle" message. An example of a complete bundle message is as follows: CompleteBundle(2, A3B4C0D1). The complete bundle message includes at least two arguments including a count (2) and learned knowledge (A3B4C0D1) in this embodiment. The count is a value indicating the number convey changes messages that were sent. The learned knowledge represents the knowledge that should have been learned by the replica receiving the complete bundle message if the messages indicated in the count have been received and added to the changes in the receiving replica. The learned knowledge can be used by the replica receiving changes to update the knowledge in the replica receiving changes. Namely, an element-wise maximum of the learned knowledge and the knowledge that was in the receiving replica forms the updated knowledge for the receiving replica. The complete bundle message is sent by a replica after that replica has sent convey changes messages. The knowledge in the complete bundle message typically supercedes the individual learned knowledge portions of the convey changes messages.

An "advertise changes" message can be sent by replicas existing in a sync community. An example of an advertise changes message is as follows: AdvertiseChanges (A4B2C0D1). The advertise changes message includes a knowledge argument (A4B2C0D1) that specifies the knowledge of the replica sending the advertise changes message when the advertise changes message is sent. The advertise changes message can be used by other replicas within the sync community to determine if the replica sending the advertise changes message has changes not in the other replicas. In this case, the other replicas can issue a request changes message to the replica sending the advertise changes message.

Another message is an "acknowledge change" message. In embodiments where each replica only keeps information about themselves (their own knowledge), the acknowledge message is not typically needed because whether a change was applied is reflected in the replica's knowledge. However, the acknowledge change message informs the recipient of the message what occurred when the sender of the message attempted to apply a change. In some embodiments, the originator replica of the changes keeps a record of what changes it sent to which replica. In this case, the originator replica needs to receive acknowledgements in order to update its records.

A "cancel change flow" message is used to indicate that a particular replica does not want to receive further changes pursuant to a prior request changes message or request. Typically, a complete bundle message should be sent if the cancel change flow message is sent mid-bundle.

A "convey knowledge" message is sent by one replica to another to indicate that the knowledge of the sending replica has changed. A convey knowledge message may be used, for example, when the sending replica receives a change from a third party. The sending replica can send a convey knowledge message such that the receiving replica does not send the change that the sending replica received from the third party.

While the examples above have shown various type of knowledge in a vector representation, it should be understood that embodiments of the invention contemplate knowledge being represented in different ways including as a collection of change IDs and as vectors with exception lists as will be described in more detail below.

In some situations, it may be desirable only to perform a partial replication of changes between replicas. One example of such a situation is an example where one replica is an email inbox on an email server and another replica is an email inbox on a laptop computer. While traveling with the laptop computer, it may be less desirable to replicate the entire email inbox on the email server as the replication may be through a dial-up connection in a hotel room, or in some other mobile but slower fashion. Nonetheless, certain messages may need to be downloaded for whatever reason. By applying filters to the protocol messages, partial replication of only the desired messages may be accomplished.

The request changes message may be modified to include a filter argument such as in the following example: Request-Changes(Knowledge, Filter). This signals to the replica receiving the request changes message that only changes that need to be replicated (i.e. those not existing on or known by the requesting replica) that also satisfy the filter conditions should be sent to the requesting replica. A convey changes message, or a series of convey changes messages, sends to the requesting replica those items that need to be replicated that also satisfy the filter conditions.

A complete bundle message is sent that includes the bundle count and filtered learned knowledge. The filtered learned knowledge represents knowledge that will be learned, except for knowledge corresponding to changes that do not meet the filter conditions, if changes in the convey changes messages indicated by the bundle count are applied to the changes in the replica receiving changes.

At this point, the requesting replica needs to maintain both knowledge and filtered learned knowledge. So long as the filters are in place, the filtered learned knowledge will be used and updated in the same manner as the knowledge was used and updated in the absence of filters. When the filters have been removed and the requesting replica requires a full replication of all changes, the requesting replica sends a request changes message that includes both the knowledge and the filtered learned knowledge. The replica receiving this request changes message can then send any changes not on or known about by the requesting replica. These changes are those that would normally be sent if only the knowledge was sent as an argument to the request changes message minus any of those changes that satisfy the filter conditions (as those changes have already been replicated).

In some embodiments of the invention, a minimum knowledge argument is sent with the convey changes and complete bundle messages. The minimum knowledge argument specifies the minimum knowledge that should currently exist on the replica receiving the convey changes and complete bundle messages for the convey changes and complete bundle messages to have transmitted a complete or valid replication. If the replica receiving the convey changes and complete bundle messages does not have this minimum knowledge, then a replication in light of the knowledge currently on the replica receiving the convey changes and complete bundle messages should be performed.

One example of where the minimum knowledge argument may be useful arises in the context of a replica whose knowledge is less at the end of a replication than it was at the beginning. For example, a replica sends a request changes message. During the period between sending the request changes message and receiving convey changes messages, the replica experiences a failure that requires restoration of data that includes less changes than the replica had when it requested changes. Because the knowledge argument sent with the request changes message no longer represents the true state of the replicas knowledge, the changes conveyed to the replica will not result in a complete replication because the replica conveying changes only sends those needed in light of the knowledge sent in the request changes message. When the replica requesting changes receives a minimum knowledge argument in a convey changes or complete bundle message that requires more knowledge than the replica actually has, the replica will simply discard any changes sent and request a full replication from the knowledge currently on the requesting replica.

Referring now to FIG. 2, one embodiment of the invention illustrates how changes are managed in a replica. FIG. 2 shows a time wise progression of a replica A 200. Replica A 200 includes knowledge 202, in this case labeled $K_A$, and changes 204 in this case labeled $\Delta_A$. Each change in the changes 204 is the current data content of an item. A change may refer to a new item added to a replica even though no item was changed per se, the deletion of an item, and the like. Each of the changes 204 is associated with a version that in one embodiment of the invention is a change ID. Notably, one advantageous aspect of the invention is that there is no need to maintain a change log including information about previous changes. Rather, each replica includes knowledge and a database of changes (i.e. current items) where each change has a corresponding version. At time (1), replica A 200 is in a steady state. At time (2), a user inputs a change labeled X into replica A 200. FIG. 2 shows the change X being added as a member of the changes 204. The knowledge 202 is updated to include a change ID, ChangeID(X), that is associated with the change X and identifies the addition of the change X to the changes 204. This embodiment illustrates one way in which changes to the replica are associated with specific change IDs. The knowledge 202 may be a knowledge vector and represents the changes that the replica A 200 is aware of.

Figure 3:
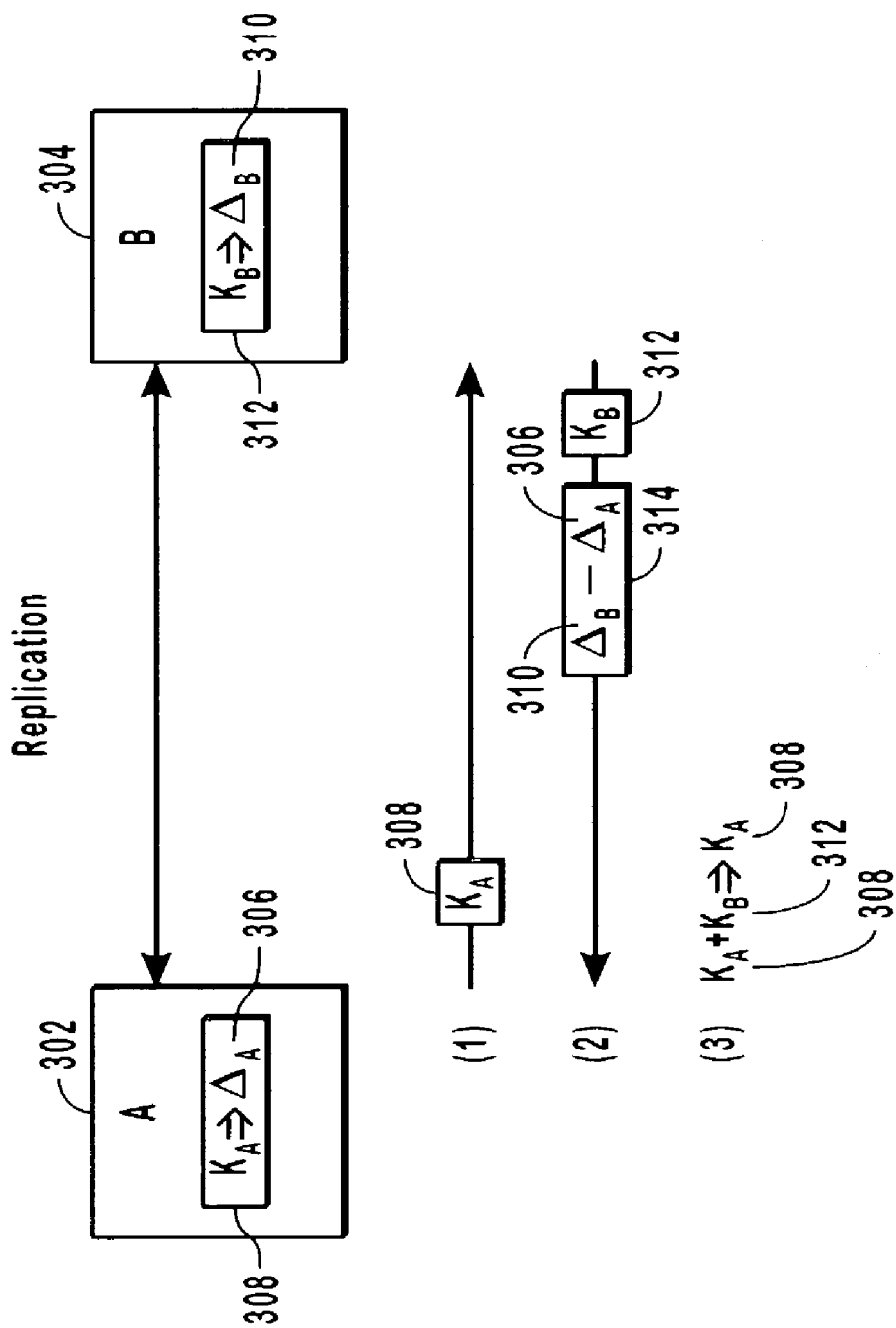
FIG. 3 illustrates one embodiment of a timewise replication scenario between two replicas.

FIG. 3 illustrates the use of knowledge to enumerate changes during replication. FIG. 3 shows two replicas, namely replica A 302 and a replica B 304. Replica A 302 includes a set of changes 306 in this example labeled $\Delta_A$. Replica A 302 further includes knowledge 308, in this example labeled $K_A$. The knowledge 308 includes a list of change IDs such as those described above. Similarly, replica B 304 includes a set of changes 310 each associated with a version that is a change ID. To begin the replication, at time (1) replica A 302 sends a replication request, such as a request changes message, to replica B 304 that includes the knowledge 308. Replica B 304, by comparing the knowledge 308 to the versions associated with each of the changes in the set of changes 310, can make decisions regarding which of replica B's changes 310 replica A 302 already has in its changes 306 and changes about which replica A is aware of. Thus, replica B 304 sends to replica A 302 at time (2), in a convey changes message, only that portion of Replica B's changes 310 that are associated with versions that are not included in the knowledge 308 of replica A 302 as illustrated by changes 314. For example, if the knowledge vector of replica A was A3B12 and the knowledge vector of replica B has current changes associated with versions that are change IDs B13 and B14, then the changes sent to the replica A would include those associated with the change IDs B13 and B14.

In addition, replica B 304 also sends replica B's knowledge 312 to replica A 302. This can be done in one embodiment of the invention by sending the knowledge as part of the convey changes message, or as part of a complete bundle message. Because replica B 304 has sent all of the changes 310 available in replica B 304 not already in Replica A 302 to replica A 302, replica A 302 now has all of the changes 306 that were originally in replica A 302, insofar as those changes 310 have not been superceded by the changes sent by replica B 304, in addition to the changes 310 that were originally in replica B 304. Replica A 302 further has information about all of the changes that replica B 304 was aware of. Therefore, replica A 302 can update its knowledge 308 to reflect the addition of the changes 310. This is done simply by adding replica A's knowledge 308 to replica B's knowledge 312 and defining that value as replica A's knowledge 308 such as is shown at time (3) in FIG. 3.

As such, an efficient replication is performed wherein only the needed changes are replicated and wherein the individual replicas replicating only need to maintain information regarding the changes that reside within the particular replica and previous changes about which it is aware of. While this example shows a complete replication of all of the changes on replica B to replica A, cases exist where only portions of the changes are replicated. As such, only change IDs that correspond to changes that are replicated are added to the knowledge of the replica receiving updates.

Figure 4:
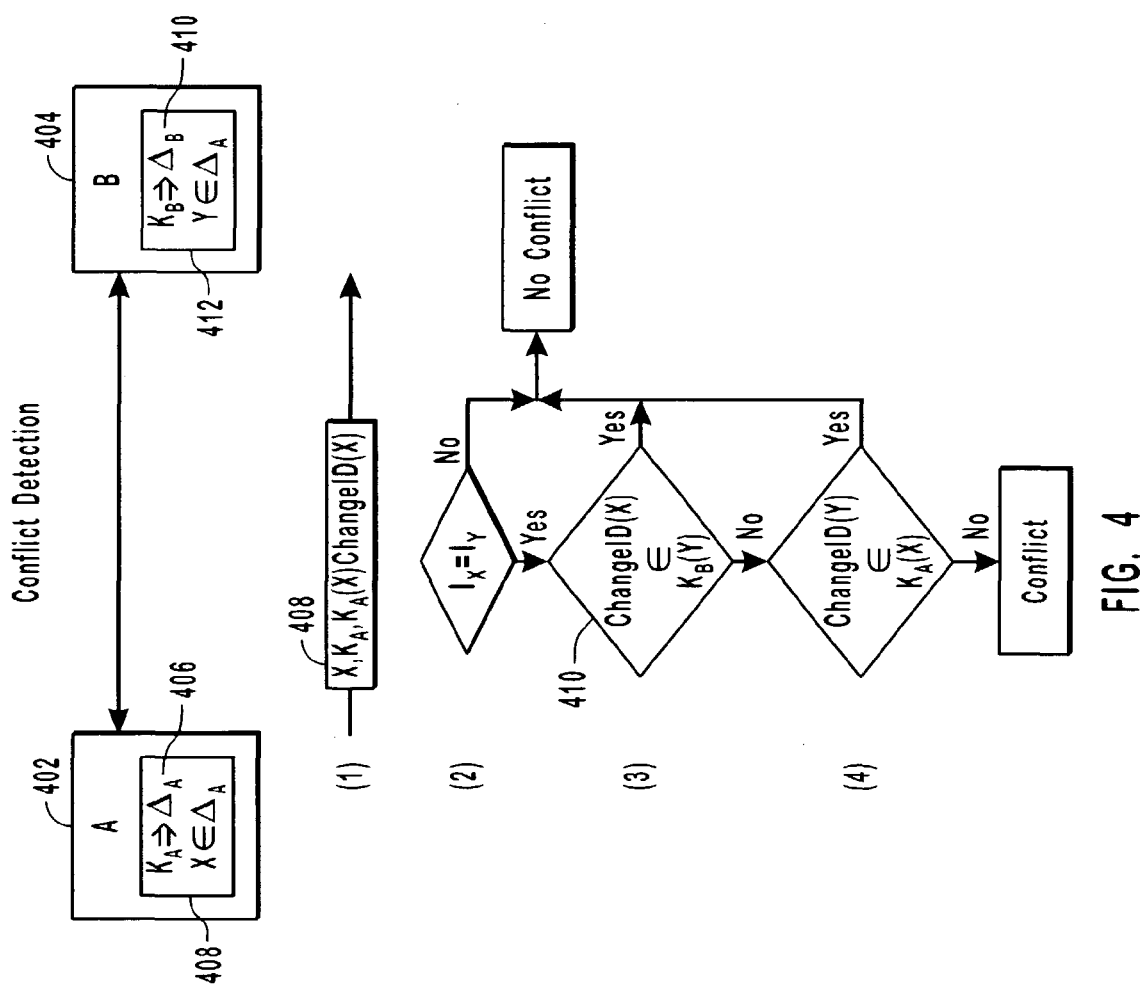
FIG. 4 illustrates one embodiment of a timewise conflict detection scenario.

In addition to enumerating changes, knowledge of a replica can also be used in conflict detection. Referring now to FIG. 4, one embodiment of the present invention illustrates how conflict detection can be accomplished. FIG. 4 shows two replicas connected by an electronic link (wireless and/or wired) for communication and replication. Replica A 402 includes knowledge 408 and a set of changes 406. As with the example in FIG. 3, the knowledge 408 includes a collection of change IDs associated with the changes 406 and associated with previous changes. Replica A 402 further includes, for purposes of this example, a change to an item made in replica A 402. The change is labeled X and X is a member of the changes 406. Similarly, replica B 404 includes knowledge 412, a collection of changes 410 and a change to an item labeled Y that is a member of the changes 410. Illustratively, at time (1) replica A 402 sends change X to replica B 404.

Associated and sent with change X in a convey change message are two other values, namely the change ID associated with change X, labeled ChangeID(X), and a made-with-knowledge value, labeled $K_A(X)$. The made-with-knowledge value is the knowledge that existed in replica A 402 at the time change X was made to replica A 402. Alternatively, in some embodiments of the invention the made-with-knowledge may be the knowledge that existed in a replica when a change is sent. Replica A's current knowledge 408 may also be sent to replica B 404 in the convey changes message or in a subsequent complete bundle message. As shown in time (2), replica B 404 compares the item changed by change X with the item changed by change Y. If change X and change Y correspond to different items, then there is no conflict.

If the changes refer to different versions of the same item, then further analysis is required. Replica B 404 then checks to see if change X was known to replica B 404 when change Y was made in replica B 404. Change Y has a change ID, ChangeID(Y) and a made-with-knowledge value, $K_B(Y)$, associated with it. If ChangeID(X) is a member of change Y's made-with-knowledge, $K_B(Y)$, then there is no conflict. In other words, change Y was made in replica B 404 with knowledge of the change X made in Replica A 402. As such, the change Y now represents the most current and valid data for the replicas A and B. Although not shown in the example illustrated by FIG. 4, at a subsequent time, change Y will likely be sent in a convey changes message to replica A 402 and the item associated with changes X and Y updated to change Y on the replica A 402 in a fashion described in FIG. 3.

If the changes X and Y are for the same item, and ChangeID (X) does not appear in $K_B(Y)$, then as shown at time (4), a check is done to see if change Y was known by replica A 402 when change X was made. This is typically done by checking to see if the change enumeration for change Y, illustrated as ChangeID(Y), is included in replica A's knowledge 408 at the time change X was made, $K_A(X)$. If ChangeID(Y) is a member of $K_A(X)$, then change X was made-with-knowledge of change Y and there is no conflict. Change X is the most current and valid change for the particular item. As such, replica B 404 will likely be updated with change X in a fashion as described in FIG. 3.

If the changes X and Y are for the same item, the ChangeID (Y) does not appear in $K_A(X)$ and ChangeID(X) does not appear in $K_B(Y)$, then a true conflict exists. In other words, change X and change Y were made independent of each other. In this case, a conflict will be reported, such as through a message in the protocol adapted to notify replicas of conflicts, and various conflict resolution rules may be applied to determine which change, X or Y, is the most current and valid change. Such rules may include checking time stamps to determine which change was made most recently, always resolving conflicts in favor of certain type of replicas (such as those stored on servers) and/or any other suitable conflict resolution. Alternatively, in one form of conflict resolution, an item with conflicting changes may be updated such that conflicting changes are merged to form a new change.

A common usage of the protocol is between two replicas that may be in a sync community. In FIG. 4, for example, the replica A 402 is a source replica and the replica B 404 is a destination replica. The destination replica may initiate replication by sending a request changes message. The source replica replies with a convey changes message, which informs the destination replica of all of the new changes known to the source replica. To achieve two-way replication, the source replica then acts as the destination replica and sends a request changes message. Subsequently, a convey changes message is received to complete the two-way replication in this example.

Figure 5:
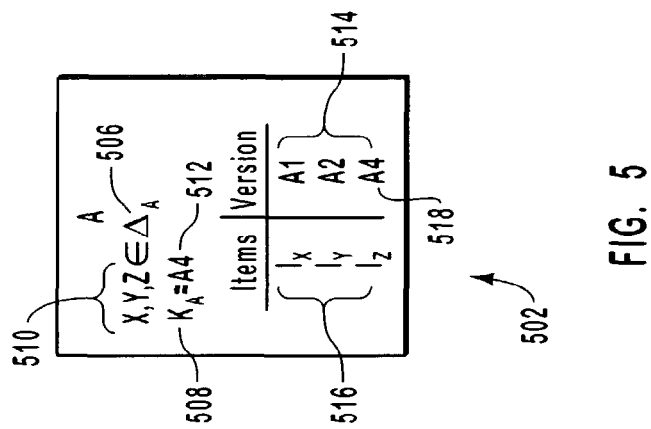
FIG. 5 illustrates an example of assigning change IDs to changes in a replica.

Referring now to FIG. 5, one exemplary embodiment of Change IDs and knowledge tracking is shown. FIG. 5 shows a replica 502. The replica 502 includes a collection of changes 506 and knowledge 508. The collection of changes 506 includes several individual changes 510 in this example illustrated as X, Y and Z. In the example shown in FIG. 5, the present state of the knowledge of the replica is denoted by a knowledge vector 512 that in this case is A4. The knowledge vector 512 represents all of replica A's knowledge 508.

Also represented in FIG. 5 is a number of change IDs 514. In the example of FIG. 5, replica A 502 includes three changed items 516, $I_X$, $I_Y$, and $I_Z$, corresponding to the changes 510. Using the change IDs, one can discern that the item $I_X$, with change ID A1, was made in replica A 502 at a first time. Change $I_Y$, with change ID A2, was made in replica A 502 at a time subsequent to the item $I_X$. And the item $I_Z$, with change ID A4, was made in replica A 502 at a time subsequent to when the item $I_Y$ was made. A3, though not illustrated directly in FIG. 5, may correspond to a previous change such as in one example, a change that is superceded by the change to item $I_Z$ labeled A4.

There is a difference between the change ID A4 and replica A's knowledge vector 512 that is also labeled A4. In this example, the knowledge vector A4 signifies that replica A's knowledge 508 includes the changes corresponding to the change IDs labeled A4, A3, A2 and A1. Said differently, a knowledge vector includes the change represented by the change ID 518 that is equal to the knowledge vector as well as all changes with the same replica ID that were made previous to the change ID 518 represented in the knowledge vector. On the other hand, in the present example the change ID 518 labeled A4 only represents the change Z made to item $I_Z$.

Figure 6:
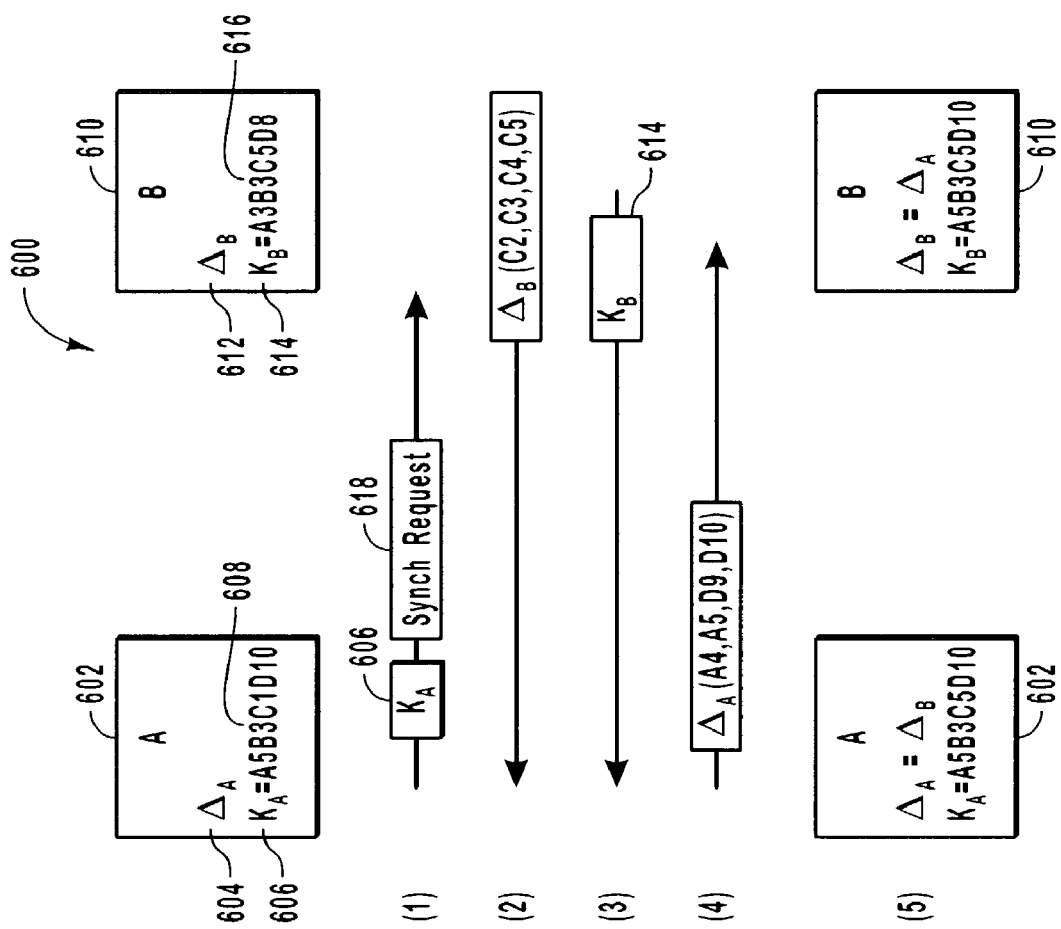
FIG. 6 illustrates one embodiment of a timewise replication scenario using knowledge vectors.

Referring now to FIG. 6, an example of two replicas replicating in a topology containing a number of replicas is shown. Replica A 602 contains a set of changes 604, knowledge 606 and a knowledge vector 608 that is a short hand representation of the knowledge 606. Illustratively, the knowledge vector 608 of replica A 602, A5B3C1D10, shows that replica A's knowledge 606 includes changes made up to a fifth change in replica A 602, knowledge up to a third change in a replica B 610, knowledge up to a first change in a replica C and knowledge up to a tenth change in a replica D. Replica B 610, in the example of FIG. 6, includes a set of changes 612, knowledge 614 and a knowledge vector 616 that is a shorthand representation of replica B's knowledge 614. Replica B's knowledge vector 616, A3B3C5D8, illustrates that; replica B has knowledge including knowledge up to a third change made by replica A 602, knowledge up to a third change made by replica B 610, knowledge up to a fifth change made by replica C and knowledge up to an eighth change made by replica D. The knowledge vectors set forth above include a continuous representation of change enumerations made by a replica from a first change to some subsequent change. As will explained in more detail later herein, a knowledge vector may also include a beginning point that is some other change enumeration than the first change enumeration made by a replica.

A time wise illustration of the replication of replica A 602 with replica B 610 is illustrated in FIG. 6. At time (1), replica A 602 sends a synch request 618, such as in a request changes message, that includes replica A's knowledge 606, that may be represented by replica A's knowledge vector 608, to replica B 610. Replica B 610 at time (2) examines replica A's knowledge 606 by comparing it to change IDs associated with the changes in Replica B. Replica B 610 discovers that replica A is not aware of changes made by replica C that are labeled with the change IDs C2, C3, C4 and C5. Thus, replica B sends replica B's changes 612 corresponding to these change IDs in one or more convey changes messages so long as the changes labeled with those change IDs are the current changes applicable to items in Replica B 610. If a change ID corresponds to a previous outdated change, no change corresponding to that ID is sent. For example, if an item that had a version C3 was updated and assigned a new version, the change associated with C3 no longer exists in replica B 610 and is not sent ro replica A. Subsequently in a complete bundle message or simultaneously as part of the convey changes message as illustrated in time (3) replica B 610 sends to replica A 602 replica B's knowledge 614 that may be represented as a knowledge vector 616.

At time (4) replica A 602 examines the knowledge 614 sent by replica B by comparing it to the change ID's corresponding to changes in replica A 602. Replica A 602 discovers that replica B does not have either the changes represented by the change IDs A4, A5, D9 and D10, or knowledge about those changes. Thus, replica A 602 sends, using one or more convey changes messages, the current changes existing in replica A's changes 604 corresponding to those change IDs (except when the change ID represents an outdated change such that no change is sent). Replica A 602 may subsequently send a complete bundle message to replica B 610 indicating that all changes have been sent such that replica A 602 and replica B 610 can now update their knowledge vectors 608 and 616 respectively to include the recently replicated changes. As shown in FIG. 6 at time (5), replica A's knowledge vector, A5B3C5D10, is equal to replica B's knowledge vector which includes all changes made by replica A up to a fifth change enumeration, all changes made by replica B up to a third change enumeration, all changes made by replica C up to a fifth change enumeration and all changes made by replica D up to a tenth change enumeration.

Referring now FIGS. 7A and 7B, two methods of updating the knowledge vectors following a complete replication such as that represented in FIG. 6 are shown. Specifically, FIG. 7A illustrates a method for updating the knowledge vectors using an exception list 702 stored on a replica. To create an exception list 702, as changes are sent between replicas, the changes are sent with a change ID associated with the change. When the change is added to a replica, the change ID is added as an exception to an exception list 702. Examining now the knowledge for replica A in FIG. 7A; the knowledge includes a knowledge vector 608 and an exception list 702 which includes the exceptions C2, C3, C4 and C5. An examination of the exception list 702 in conjunction with the knowledge vector 608 reveals that including the change IDs from the exception list 702, the knowledge of Replica A includes all changes up to a fifth change made by replica C. Thus, the exceptions can be removed from the knowledge of Replica A 602 and the knowledge vector updated to include an element C5 as shown in the updated knowledge vector 704. A similar analysis can be performed on the knowledge 614 of replica B 610. The original knowledge vector 616 combined with the exceptions A4, A5, D9 and D10 in the exception list 703 allows the knowledge vector 616 to be updated to an updated knowledge vector 706.

Notably, if only a partial replication was performed, such as for example if the changes corresponding to the change IDs A4 and D9 were not sent in a replication such as that represented by FIG. 6, then the knowledge 614 of replica B 610 would need to maintain the exceptions A5 and D10 until a subsequent replication with another replica that transfers the changes represented by the change IDs A4 and D9 to replica B 610.

FIG. 7B illustrates another method of updating the knowledge vectors 608 and 616 to reflect the replication shown in FIG. 6. In this example, the knowledge vectors are updated using an element-wise maximum for each of the elements in the original knowledge vectors 608 and 616 to form an updated knowledge vector 708. The first element of each of the knowledge vectors 608 and 616 corresponds to a set of change IDs labeling changes made in replica A. Because A5 is the element-wise maximum element of the two knowledge vectors 608 and 616, the updated knowledge vector 708 includes an element A5. Likewise, the vector elements B3, C5 and D10 each represent an element-wise maximum element corresponding to the changes on the particular replicas to which each of the elements correspond. Examination of each of the updated knowledge vectors 704, 706 and 708 reveals that by either method, the same updated knowledge vector is obtained. The element-wise maximum method of knowledge vector updating is typically used when a complete replication has been performed whereas as an exception list method of updating the knowledge vector may be useful when it is not certain that a complete replication has occurred (a user may cancel the replication, a device may crash, etc.). Namely, the exception list method may need to be used such that exceptions can continue to comprise a portion of the knowledge of a particular replica when the full knowledge of the replica cannot be represented in simple vector form.

Referring now to FIG. 7C, an example of updating knowledge is shown for a replica that has information from an incomplete replication. FIG. 7C includes an original knowledge vector 710, an original exception list 712, an updated knowledge vector 714, and an updated exception list 716. With regard to the replica shown, after the partial replication, the replica has all of the change IDs labeled A1 through A5, represented by the vector element A5, and all of the change IDs labeled A7 through A10 represented by the list of exceptions including A7, A8, A9 and A10. As shown in FIG. 7C, in an updated version of the knowledge, the updated exception list 716 can be shortened to indicate inclusion of all elements from A7 to A10 such as by the expression (A7:A10) shown in FIG. 7C. This expression is simply a vector such as those that have been previously discussed herein except that the beginning point of the vector is some other point than the first change enumeration for replica A. Thus the representation of the replica's knowledge as it relates to A is represented by the vector element A5 and the exception vector (A7:A10).

In the case of the knowledge of the replica regarding replica B, the knowledge vector 710 can be updated to include the continuous change IDs subsequent to the change IDs included in the vector element for replica B. The vector element B1 includes only the change ID B1. Because change IDs B2, B3 and B4 exist in the exception list 712, and they are continuous with the change ID B1 included in the knowledge vector 710, the vector element for replica B can be updated to B4 in the updated knowledge vector 714 which represents the inclusion of elements B1 through B4. Because the change ID B5 is missing from the exception list, the exception B6 should remain in the exception list 716 in the updated knowledge.

A similar analysis can be performed regarding the replica of FIG. 7C's knowledge regarding changes made by replica C. The original knowledge vector 710 includes C5. The original exception list includes C6, C7 and C8. Because the original knowledge vector element C5 includes change IDs C1 through C5, and C5 is continuous with the change IDs in the original exception list 712, the updated knowledge vector element for replica C can be updated to C8.

Figure 8:
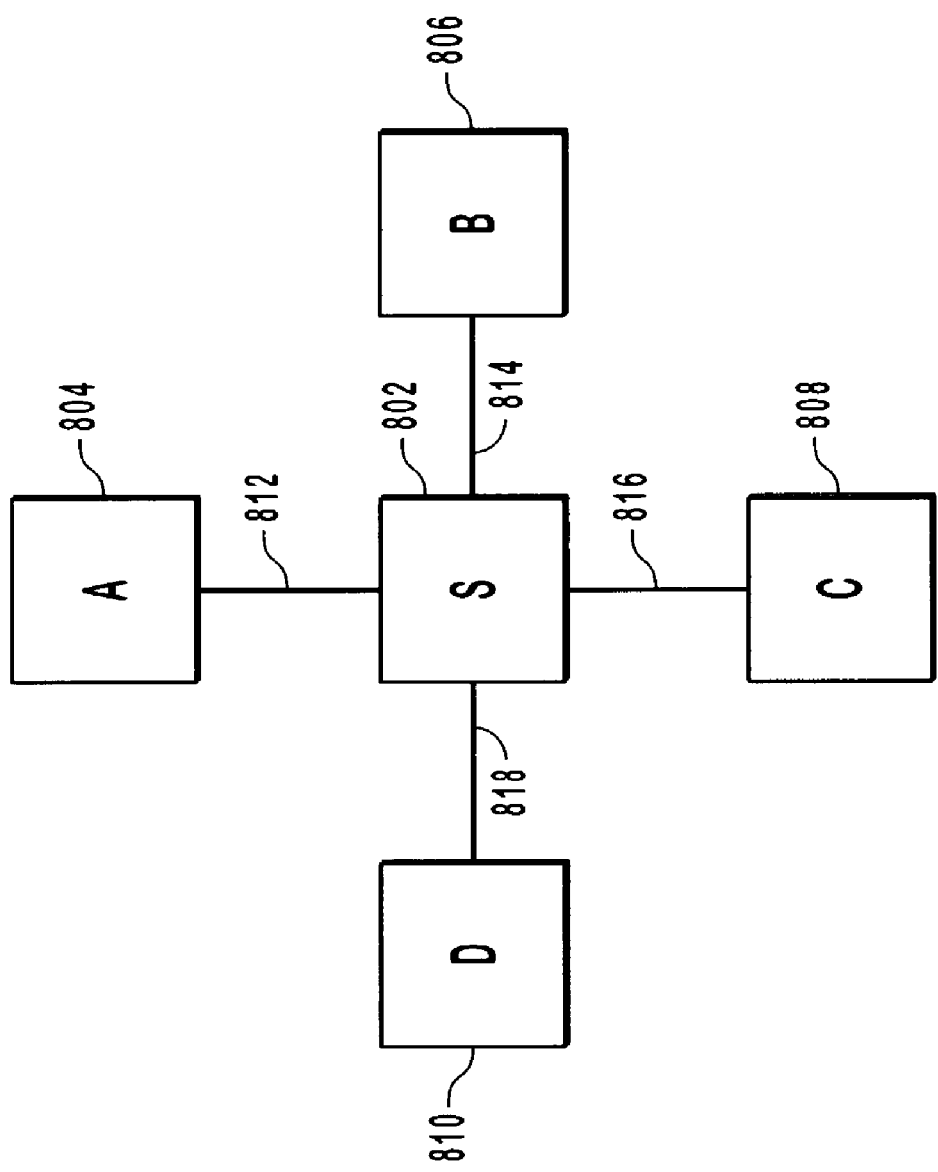
FIG. 8 illustrates a hub-and-spoke topology for implementing replication including surrogate replication.

One challenge that may arise with respect to the size of knowledge vectors is especially prevalent when the number of replicas in a sync community is great. In a topology where the knowledge vector includes a change ID or other vector element for each and every replica within the sync community, the knowledge vector increases with each replica that is added to the sync community. One optimization is to recognize that in some sync communities not every replica needs to be represented in the knowledge vector. One illustration of such a case is the sync community shown in FIG. 8 which represents a hub and spoke server topology. FIG. 8 shows a server 802 connected to a number of clients including replica A 804 replica B 806 replica C 808 and replica D 810. In this example, all replication paths 812-818 between the clients are through the server 802 and thus the server 802 can assign a change ID that includes the server 802 as the replica ID. All changes made within the individual clients 804 through 810 remain within the respective client in which the change was made without the assignment of a change ID until a replication is performed. Thus, in this example, the knowledge vector includes a single element that comprises the replica ID and change ID of the server 802. Illustratively, if a change is made in replica A 804 and replicated with the server 802 at a first time, the server 802 assigns a change enumeration of S1 to the change. At a subsequent time, a change made in replica B 806 is replicated with the server 802. This change is assigned a change enumeration by the server of S2. Notably, while in this example, the server 802 assigns all change enumerations, other embodiments may exist where the server 802 assigns some change enumerations and other replicas assign other change enumerations.

Embodiments of the invention are adaptable to optimize the knowledge vector in other topologies as well. For example, in FIG. 1, replica D 114 only replicates with replica C 110. Thus, changes made by C and D can be enumerated using change enumerations that have a single replica ID. In one example, if the replica ID of replica C is chosen to be part of the change enumeration for all changes by either replica C 110 or replica D 114, a first change in replica C would be labeled with the change enumeration C1. A subsequent change in replica D 114 is labeled C2, and so forth. When one replica creates a change ID for changes made on a different replica, the replica creating the change ID may be referred to as a surrogate author.

By optimizing the knowledge vector for the particular topology or sync community, resources used for storing the knowledge vector can be conserved in topologies that approach hub and spoke server-client topologies such as that shown in FIG. 8. In topologies more like peer-to-peer networks, a larger knowledge vector is required, but the individual replicas can effectively and independently replicate with a larger number of other replicas while avoiding problems such as synch loops, false conflicts, and the like.

When different replicas are allowed to make changes to items independent of one another, conflicts between the independently made changes may result that should be resolved. Conflict resolution typically requires that there be certain rules for determining which item version should be chosen as the valid item. Examples of some of these rules include selecting the item change that was made last or selecting item changes that are made by particular types of replicas such as preferring changes made by servers over changes made by other types of replicas. Alternatively, all conflicts could be logged for manual resolution. Manual resolution is accomplished by a user providing a new value for the item in conflict that will replace the conflicting changes.

If all replicas within a sync community or topology resolve conflicts in the same way, no other resolution rules or resolution systems are typically required as all replicas within the system will migrate to a replicated resolution of any conflicts. While the replicas within the sync community may not be specifically designed to resolve conflicts in exactly the same way, the replicas within a sync community may nonetheless resolve conflicts in exactly the same way. Such an example of this is shown in FIG. 9A. FIG. 9A shows a replica D 902. Replica D 902 receives a change ID corresponding to a change in an item $I_X$ wherein the change ID is A4. Subsequently replica D 902 receives a change ID for the same item $I_X$ wherein the change ID is B5. Replica D 902 has conflict resolution rules to choose which of the changes to item $I_X$ is the preferred change. In this case replica D chooses the change to item $I_X$ labeled by the change ID A4. To indicate that a conflict was resolved by replica D 902 and how the conflict was resolved, a new change ID is assigned to the item $I_X$ that includes both the results of the conflict resolution and a new change ID assigned by the particular replica that made the conflict resolution. The new change ID includes the next sequential change enumeration for the replica that made the conflict resolution. In this case, the new change ID is labeled A4 (D7) to indicate that the change labeled A4 was chosen in the conflict resolution and that the conflict was resolved by replica D 902. As shown in FIG. 9A, a similar process occurs when a conflict in changes is detected by a replica C 904. Replica C 904 resolves the conflict in the same manner as replica D 902. Thus a new change ID labeled A4 (C3) is assigned to the change of the item $I_X$. In this case, the conflict between the changes to item $I_X$ labeled with the change IDs A4 and B5 will eventually be resolved in the same way in all of the replicas within the topology.

Figure 9B:
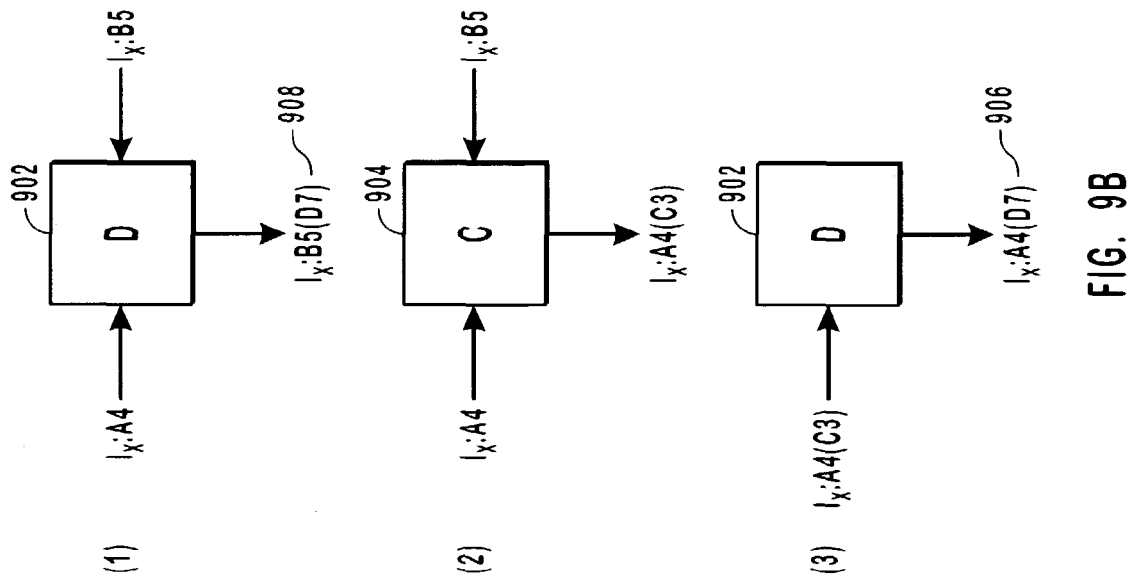
FIG. 9B illustrates other conflict resolution scenarios.
Figure 9A:
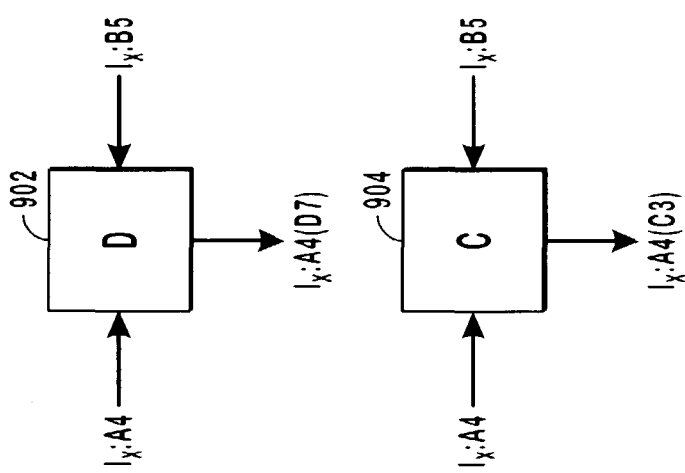
FIG. 9A illustrates examples of conflict resolution scenarios.

FIG. 9B illustrates an example where conflicts are resolved differently by different replicas within a topology. In FIG. 9B, at time (1) replica D 902 resolves the conflict in one way and assigns a new change ID to the items that illustrate the resolution of the conflict, B5, and the replica that that made the change, (D7). At time (2) replica C 904 resolves the same conflict in a different way shown by the new change ID assigned by replica C 904, A4 (C3). At time (3), replica D 902 receives replica C's resolution of the conflict. Replica D 902 at this point recognizes that this particular conflict has been resolved in two different ways. Some embodiments of the present invention therefore specify that a deterministic resolution be made between the conflicting changes to the item $I_x$. The particular deterministic resolution illustrated by FIG. 9B causes the change with the lowest value replica ID to be selected as the deterministic result. Thus, because A is a lower value replica ID than replica B the deterministic resolution of the conflict is selected to be the change labeled by the change ID A4. Replica D 902 thus changes the change ID associated with the change to item I to be A4 (D7). Note that to avoid replication loops or other conflict problems the change enumeration (i.e. D7) associated with the replica making the change is the same in the deterministic result 906 as in the original resolution of the conflict 908.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 10 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 10, an exemplary system for implementing the invention includes a general purpose computing device in the form of a conventional computer 20, including a processing unit 1021, a system memory 1022, and a system bus 1023 that couples various system components including the system memory 1022 to the processing unit 1021. The system bus 1023 may be any of several types of bus structures including a memory bus or memory controller, a peripheral bus, and a local bus using any of a variety of bus architectures. The system memory includes read only memory (ROM) 1024 and random access memory (RAM) 1025. A basic input/output system (BIOS) 1026, containing the basic routines that help transfer information between elements within the computer 1020, such as during start-up, may be stored in ROM 1024.

The computer 1020 may also include a magnetic hard disk drive 1027 for reading from and writing to a magnetic hard disk 1039, a magnetic disk drive 1028 for reading from or writing to a removable magnetic disk 1029, and an optical disk drive 1030 for reading from or writing to removable optical disk 1031 such as a CD-ROM or other optical media. The magnetic hard disk drive 1027, magnetic disk drive 1028, and optical disk drive 1030 are connected to the system bus 1023 by a hard disk drive interface 1032, a magnetic disk drive-interface 1033, and an optical drive interface 1034, respectively. The drives and their associated computer-readable media provide nonvolatile storage of computer-executable instructions, data structures, program modules and other data for the computer 1020. Although the exemplary environment described herein employs a magnetic hard disk 1039, a removable magnetic disk 1029 and a removable optical disk 1031, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 1039, magnetic disk 1029, optical disk 1031, ROM 1024 or RAM 1025, including an operating system 1035, one or more application programs 1036, other program modules 1037, and program data 1038. A user may enter commands and information into the computer 1020 through keyboard 1040, pointing device 1042, or other input devices (not shown), such as a microphone, joy stick, game pad, satellite dish, scanner, or the like. These and other input devices are often connected to the processing unit 1021 through a serial port interface 1046 coupled to system bus 1023. Alternatively, the input devices may be connected by other interfaces, such as a parallel port, a game port or a universal serial bus (USB). A monitor 1047 or another display device is also connected to system bus 1023 via an interface, such as video adapter 1048. In addition to the monitor, personal computers typically include other peripheral output devices (not shown), such as speakers and printers.

The computer 1020 may operate in a networked environment using logical connections to one or more remote computers, such as remote computers 1093 and 1083. Remote computers 1093 and 1083 may each be another personal computer, a server, a router, a network PC, a peer device or other common network node, and typically include many or all of the elements described above relative to the computer 1020. The logical connections depicted in FIG. 10 include a local area network (LAN) 1051 and a wide area network (WAN) 1052 that are presented here by way of example and not limitation. Such networking environments are commonplace in office-wide or enterprise-wide computer networks, intranets and the Internet.

When used in a LAN networking environment, the computer 1020 is connected to the local network 1051 through a network interface or adapter 1053. When used in a WAN networking environment, the computer 1020 may include a modem 1054, a wireless link, or other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing communications over wide area network 1052 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a sync community that includes one or more replicas, a method for replicating the one or more replicas, the method comprising a first replica performing:
   sending a request changes message to a second replica in a sync community, wherein the request changes message includes a knowledge including information representing a plurality of changes that the first replica is aware of by including information representing a change ID for each change that the first replica is aware of, wherein each change ID includes a replica ID associated with the change and a version specific to a specific change, wherein knowledge of at least two or more changes is included in a vector, the vector representing a plurality of change IDs, wherein each vector includes at least one replica ID identifying a replica associated with the plurality of changes, and at least one magnitude representing the number of changes in the plurality of changes;
   receiving one or more convey changes messages from the second replica, wherein each convey changes message includes at least one change that the first replica is not aware of based on a comparison by the second replica between the knowledge of the first replica and a knowledge of the second replica; and
   applying one or more of the one or more convey changes messages from the second replica to data at the first replica.

2. The method as defined in claim 1, wherein receiving one or more convey changes messages from the second replica further comprises:
   receiving a change ID for each change in each convey message; and
   receiving a made-with-knowledge value for a particular change, wherein the made-with knowledge value represents knowledge available to a particular replica when the particular replica made the particular change.

3. The method as defined in claim 1, further comprising receiving a complete bundle message from the second replica.

4. The method as defined in claim 3, wherein receiving a complete bundle message from the second replica further comprises:
   receiving a count in the complete bundle message that indicates how many convey changes messages were sent by the second replica; and
   receiving a learned knowledge in the complete bundle message that represents knowledge that the first replica should learn if the first replica received and applied the convey changes message reflected in the count.

5. The method as defined in claim 1, further comprising sending an advertise changes message to one or more replicas including the second replica in the sync community, wherein the advertise changes message includes the knowledge of the first replica and enables each of the one or more replicas to determine whether to replicate with the first replica.

6. The method as defined in claim 5, further comprising receiving a request changes message from a particular replica in response to the advertise changes message.

7. The method as defined in claim 1, further comprising:
   receiving a request changes message from the second replica, wherein the request changes message includes the knowledge of the second replica; and
   sending at least one convey changes message to the second replica, wherein the at least one convey changes message includes one or more changes, a change ID for each of the one or more changes, and a made-with-knowledge value for at least some of the one or more changes.

8. The method as defined in claim 7, further comprising sending a complete bundle message to the second replica that includes a count and a learned knowledge.

9. The method as defined in claim 1, further comprising sending a convey knowledge message to indicate to the second replica that the knowledge of the first replica has changed.

10. The method as defined in claim 1, further comprising sending a cancel change flow message to indicate that the first replica does not want to receive additional convey changes messages.

11. The method as defined in claim 1, wherein sending a request changes message to a second replica in a sync community further includes including a filter in the request changes message such that only changes satisfying the filter are sent in the convey changes messages.

12. The method as defined in claim 11, further comprising receiving a complete bundle message that includes filtered learned knowledge, wherein the first replica maintains a filtered learned knowledge and a knowledge.

13. The method as defined in claim 1, further comprising receiving a minimum knowledge in at least one of the convey changes messages, wherein the minimum knowledge identifies a minimum knowledge of the first replica in order to ensure that the first replica and the second replica have a valid replication.

14. The method of claim 1, wherein the knowledge further includes an exception list when knowledge of changes cannot be continuously represented by the vector, the exception list including additional change IDs for changes outside the range of the vector.

15. The method of claim 1, wherein the convey changes message includes a change, a change ID, and a made with knowledge value including information representing a change ID for each change known by the second replica.

16. The method of claim 1, wherein the knowledge includes information representing changes made on other replicas than the first replica.

17. The method of claim 1, wherein at least one replica ID associated with a change is a replica ID for a replica that assigns change IDs for another replica.

18. The method of claim 17, wherein the replica that assigns change IDs for another replica is a central server that assigns change IDs for clients of the central server.

19. In a sync community including one or more replicas, a method for communicating changes from a first replica to other replicas in the sync community, the method comprising:
storing a knowledge at the first replica, wherein the knowledge includes one or more change IDs that represent changes that the first replica is aware of; and
sending a convey changes message to a second replica, wherein the convey changes message comprises:
a change argument that represents a particular change;
a change ID argument that is associated with the particular change,
wherein the change ID argument identifies a particular replica that assigned a change ID to the particular change;
a made-with-knowledge argument that includes a knowledge including information representing a plurality of changes that the first replica is aware of by including information representing a change ID for each change that the first replica is aware of, wherein each change ID includes a replica ID associated with the change and a version specific to a specific change for changes the particular replica that assigned the change ID is aware of when the change ID was assigned to the particular change or when the change argument is sent, wherein knowledge of at least two or more changes is included in a vector, the vector representing a plurality of change IDs, wherein each vector includes at least one replica ID identifying a replica associated with the plurality of changes, and at least one magnitude representing the number of changes in the plurality of changes; and
wherein the made-with-knowledge argument is used to determine to selectively apply a change represented in the change argument to the second replica.

20. The method as defined in claim 19, wherein sending a convey changes message to a second replica further comprises:
storing the convey changes message on a removable medium; and
transporting the removable medium to the second replica such that the second replica can retrieve and apply the particular change.

21. The method as defined in claim 19, wherein sending a convey changes message to a second replica further comprises: storing the convey changes message on a public area in a server where the second replica can retrieve the convey changes message from the public area on the server.

22. A computer program product having computer-executable instructions for performing the method of claim 19.

23. In a sync community that includes one or more replicas, a computer program product for implementing a method for replicating the one or more replicas, the computer program product comprising:
a computer readable medium having computer-executable instructions for performing the method, the method comprising a first replica performing:
sending a request changes message to a second replica in a sync community, wherein the request changes message includes a knowledge including information representing a plurality of changes that the first replica is aware of by including information representing a change ID for each change that the first replica is aware of, wherein each change ID includes a replica ID associated with the change and a version specific to a specific change, wherein knowledge of at least two or more changes is included in a vector, the vector representing a plurality of change IDs, wherein each vector includes at least one replica ID identifying a replica associated with the plurality of changes, and at least one magnitude representing the number of changes in the plurality of changes;
receiving one or more convey changes messages from the second replica, wherein each convey changes message includes at least one change that the first replica is not aware of based on a comparison by the second replica between the knowledge of the first replica and a knowledge of the second replica; and
applying one or more of the one or more convey changes messages from the second replica to data at the first replica.

24. The computer program product as defined in claim 23, wherein receiving one or more convey changes messages from the second replica further comprises:
receiving a change ID for each change in each convey message; and
receiving a made-with-knowledge value for a particular change, wherein the made-with knowledge value represents knowledge available to a particular replica when the particular replica made the particular change.

25. The computer program product as defined in claim 23, further comprising receiving a complete bundle message from the second replica that includes a count of the number of convey messages sent by the second replica and a learned knowledge that represents knowledge the first replica should learn if the first replica received and applied the number of convey changes messages reflected by the count.

26. The computer program product as defined in claim 23, further comprising sending an advertise changes message to one or more replicas including the second replica in the sync community, wherein the advertise changes message includes the knowledge of the first replica and enables each of the one or more replicas to determine whether to replicate with the first replica.

27. The computer program product as defined in claim 23, further comprising:
receiving a request changes message from the second replica, wherein the request changes message includes the knowledge of the second replica;
sending at least one convey changes message to the second replica, wherein the at least one convey changes message includes one or more changes, a change ID for each of the one or more changes, and a made-with-knowledge value for at least some of the one or more changes; and
sending a complete bundle message to the second replica that includes a count and a learned knowledge.

28. The computer program product as defined in claim 23, wherein sending a request changes message to a second replica in a sync community further includes including a filter in the request changes message such that only changes satisfying the filter are sent in the convey changes messages.

29. The computer program product as defined in claim 28, further comprising receiving a complete bundle message that includes filtered learned knowledge, wherein the first replica maintains a filtered learned knowledge and a knowledge.

30. The computer program product as defined in claim 23, further comprising receiving a minimum knowledge in at least one of the convey changes messages, wherein the minimum knowledge identifies a minimum knowledge of the first replica in order to ensure that the first replica and the second replica have a valid replication.

* * * * *